(12) United States Patent
Morales (10) Patent No.: US 11,061,626 B2
(45) Date of Patent: Jul. 13, 2021

(54) MACHINE LEARNING PRINTER CONTROL SYSTEM INCLUDING PRE-PRESS ACTION PREDICTOR

(71) Applicant: KYOCERA Document Solutions Inc., Concord, CA (US)

(72) Inventor: Javier A. Morales, Rochester, NY (US)

(73) Assignee: KYOCERA Document Solutions Inc., Osaka (JP)

( * ) Notice: Subject to any disclaimer, the term of this patent is extended or adjusted under 35 U.S.C. 154(b) by 214 days.

(21) Appl. No.: 16/422,856

(22) Filed: May 24, 2019

(65) Prior Publication Data

US 2020/0371723 A1    Nov. 26, 2020

(51) Int. Cl.
| | | |
|---|---|---|
| *G06F 3/12* | (2006.01) | |
| *G06N 3/08* | (2006.01) | |
| *H04N 1/00* | (2006.01) | |

(52) U.S. Cl.
CPC .......... *G06F 3/1204* (2013.01); *G06F 3/1254* (2013.01); *G06F 3/1257* (2013.01); *G06N 3/08* (2013.01); *H04N 1/00411* (2013.01); *H04N 1/00708* (2013.01); *H04N 1/00718* (2013.01); *H04N 1/00724* (2013.01)

(58) Field of Classification Search
CPC .... G06F 3/1204; G06F 3/1254; G06F 3/1257; H04N 1/00718; H04N 1/00708; H04N 1/00724; H04N 1/00411; G06N 3/08
USPC ........................................................ 358/1.13
See application file for complete search history.

(56) References Cited

U.S. PATENT DOCUMENTS

| | | | |
|---|---|---|---|
| 5,155,849 A | 10/1992 | Westfall et al. | |
| 5,991,709 A | 11/1999 | Schoen | |
| 7,698,642 B1 | 4/2010 | Sarin | |
| 7,999,956 B2 | 8/2011 | Rai | |
| 8,098,402 B2 | 1/2012 | Jacobs et al. | |
| 8,107,106 B2 | 1/2012 | Rai | |
| 2002/0016825 A1 | 2/2002 | Uchida et al. | |
| 2002/0046220 A1 | 4/2002 | Freeman et al. | |
| 2002/0194227 A1 | 12/2002 | Day et al. | |
| 2005/0154692 A1 | 7/2005 | Jacobsen et al. | |
| 2006/0023238 A1* | 2/2006 | Blaszyk | G06F 3/1206 358/1.13 |
| 2010/0254629 A1 | 10/2010 | Pigeon et al. | |
| 2011/0304873 A1 | 12/2011 | Smith et al. | |
| 2012/0237139 A1 | 9/2012 | Pigeon et al. | |
| 2012/0246565 A1 | 9/2012 | Kumamoto | |
| 2019/0026550 A1* | 1/2019 | Yang | G06N 3/0454 |
| 2019/0173914 A1* | 6/2019 | Irimie | G06F 21/552 |

(Continued)

OTHER PUBLICATIONS

"Machine Learning or Artificial Intelligence", Brian Tully, Aug. 8 2016, https://www.int-color.com/single-post/2017/01/17/ProofICS.

*Primary Examiner* — Fan Zhang
(74) *Attorney, Agent, or Firm* — Rowan TELS LLC (57) ABSTRACT

A machine learning applies page parameters of a complex document file to transform the complex document file into pre-press operator action predictions for the complex document file. Prompts are generated on an operator console for a pre-press operator to confirm the pre-press operator action predictions, and to apply responses to the prompts to enhance the classification model and to control a printer.

17 Claims, 6 Drawing Sheets

(56) References Cited

U.S. PATENT DOCUMENTS

2020/0202155 A1* 6/2020 Ikeda ................. G06K 9/00456
2020/0361210 A1* 11/2020 Sato .................... B41J 2/16532

* cited by examiner

MACHINE LEARNING PRINTER CONTROL SYSTEM INCLUDING PRE-PRESS ACTION PREDICTOR

BACKGROUND

Document assembly is a process by which a production print pre-press operator prepares a complex document such as a course pack type document or manual type document for printing by a printing system.

For example, a course pack type document may be assembled from portions of multiple distinct documents. A professor may select one or more chapter from various books as well as other reference material for a course pack type document. The pre-press operator assembles the chapters, manipulates the resulting complex document, and specifies job ticketing for production printing.

During the course of document assembly the pre-press operator may perform the following operations:
1. page de-skewing, page de-speckling, masking page holes, and otherwise enhancing scanned images of the document sections.
2. changing page numbers
3. adding page tabs with annotations
4. resizing and/or rotating document pages
5. adding blank pages
6. defining a color mode, plex, chapter start positions, and media content
7. defining page tab stock for added or existing page tabs Another use case is when the pre-press operator receives a complex document file with personalized content for multiple recipients. For example, the pre-press operator may receive a print job for an informational packet type document that should include a cover letter, one or more loose sheets, product information, a saddle stitched booklet type document, and forms in a corner-stapled set. These materials may be received, for example, as a large Portable document Format (PDF) file with hundreds of pages.

To process the complex document file into the final print form, the pre-press operator may perform the following operations:
1. imposing the product information pages into a booklet type document
2. defining one or more finishing command (none, saddle stitch, corner stitch) for each recipient's page The processing by the pre-press operator may be manual, automated, or a combination of the two. Manual operation involves selecting one or more pages and then specifying the page modifications to the system manually. In an automated process the pre-press operator may define job ticketing rules such as:
1. rules for adding page tabs
2. rules for adding a chapter start positions (e.g., between document sections, on document pages that use a larger font size than preceding pages, etc.)
3. rules for adding chapter start positions for pages that have a number within a defined rectangle if said number matches a configured regular expression
4. rules for adding page tab for pages that contain rotated text (or rotated text within a defined area)
5. rules for adding subset finishing when pages contain specified content
6. rules for use of print color for pages that include images larger than configured dimensions
7. rules for adding page tabs before pages that contain bookmarks and use the bookmark text for page tab annotation In an automated process a composition engine operates to add the required job ticketing, either using direct commands or by generating metadata that is interpreted at later processing steps.

Current mechanisms of pre-press operation suffer from a number of limitations. Manual processes tend to be time consuming and error prone. Automated processes often utilize extensive metadata during composition of the complex document and/or a content management system. Automated processes may also rely on the use of complex and inflexible content evaluation rules.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are mechanisms utilizing machine learning to streamline aspects of manual pre-press operations, such as assembling multiple distinct documents into a single complex document. The pre-press operator can define document sections, page manipulations, numbering, page tabs and page tab annotations, media, finishing, and other aspects of pre-press operations.

A machine learning system is utilized to learn from pre-press operator actions and perform an initial set of pre-press actions the pre-press operator may then review and modify if not correct, thus defining an error function for the machine learning.

In one embodiment, when a document is first opened, the system performs processing to determine page parameters for each document page. The determined page parameters for each document page may include, for example, the following:
1. page number from the start of the document (e.g. page 3) and from the end of the document (e.g. 43rd page from the end)
2. if the document includes metadata, the metadata is applied to define document sections; if the pre-press operator adds document sections to the document, get the page number for the start and end of the document sections
3. page parity (odd page number or even page number)
4. page dimensions and page orientation
5. text orientation (portrait page orientation, landscape page orientation, mixed-mainly portrait page orientation, mixed-mainly landscape page orientation)
6. font sizes used by the document page 7. page tab annotation for the document page (use position and orientation)
8. page number
9. word count for the document page
10. text block locations for the document page
11. content area coverage for the document page
12. content types used on the document page: images (include size and placement), text, tables, etc.
13. color vs mono area coverage on the document page
14. page bookmark contents and structure Once the page parameters have been determined, the system determines correlations between (a) pre-press operator actions and map page actions (e.g. resizing, rotating, and page tab annotation) and (b) the determined page parameters. Pre-press operator actions that are monitored for correlations may include:

1. resizing and rotating document pages
2. page de-skewing, page de-speckling, marking page holes
3. page numbering
4. adding page tabs and page tab annotations
5. defining media and one or more finishing property The correlations between page parameters and pre-press operator actions are applied to build a model for machine learning to generate predictions of pre-press operations (rules). For example, the system may learn the following rules:

1. the first and last two document pages are to be assigned to a different, heavier page stock
2. page tabs are to be added between concatenated files or document sections
3. page tab annotations are to be added before document pages with top-level bookmarks and page tab annotations are to use the bookmark text
4. document pages with large images are to have a coated page stock
5. document pages larger than 10×14 are to be resized to 11×17 or A3
6. document pages having an odd page number and landscape page orientation, and which are smaller than 10×14 are to be resized to letter or A4 and rotated counterclockwise (whereas even page numbers are rotated clockwise)
7. page numbers are to reset at a file or section boundary
8. page numbers are not to be placed on pages that include very large images The system utilizes a supervised learning model in which the page parameters are the input data and the pre-press operator actions are output as predictions job ticketing and pre-press operations on the document pages of complex documents processed in the future.

The system implements a classification model that generates correlations between document pages and specific page operations. For example the system may generate correlations for:

1. page parameters indicating to convert the document page into a page tab
2. page parameters indicating to add a page tab or a blank page
3. page parameters indicating when to resize or rotate a document page The system may be initialized with an initial set of classification rules. Alternatively or additionally, the system may utilize unsupervised or semi-supervised learning from monitored pre-press operator actions to generate predictions about actions to apply to document pages (e.g. which pages the pre-press operator is likely to resize or rotate in a complex document).

As the pre-press operator prepares additional documents for printing, the system monitors pre-press operator actions and applies them to the machine learning system which generates predictions and error functions to iteratively adjust the classification model. When the accuracy of a particular prediction (e.g. add page tab at section boundary) reaches a certain threshold the system may perform the action as an automated action for the pre-press operator (in some cases, after first prompting the pre-press operator for permission to perform the automated action).

The system may prompt the pre-press operator to confirm an automated action. Alternatively, the system may perform one or more automated action when a document is opened and present the pre-press operator the option to review and correct the automated actions performed by the system (corrections by the pre-press operator are input to the machine learning system to update the classification model).

As the classification model is refined it may prompt for or carry out an increasing number of automated actions. In this manner, over time, the system may learn to automate a substantial portion of the pre-press operations and job ticketing performed by a pre-press operator.

In one embodiment the machine learning system may also classify documents by type (e.g., text document type, table-rich document type, image-rich document type etc.) and build multiple classification models so that, for example, financial statements are automatically recognized and processed differently than photo book type documents.

The machine learning system may generate different classification models for individual people who use the services of a pre-press operator, or may generate classification models for one or more pool of such users. Examples include generating a classification model for users of a particular customer, generating a classification model for users of a given type of customer (e.g. real estate offices), or generating a classification model for users across all customers.

The machine learning system may have a learning function configured to give more learning weight to pre-press operator actions for jobs of users is particular categories, such as users of the same customer or same customer type (especially if they are high-volume users).

Figure 1:
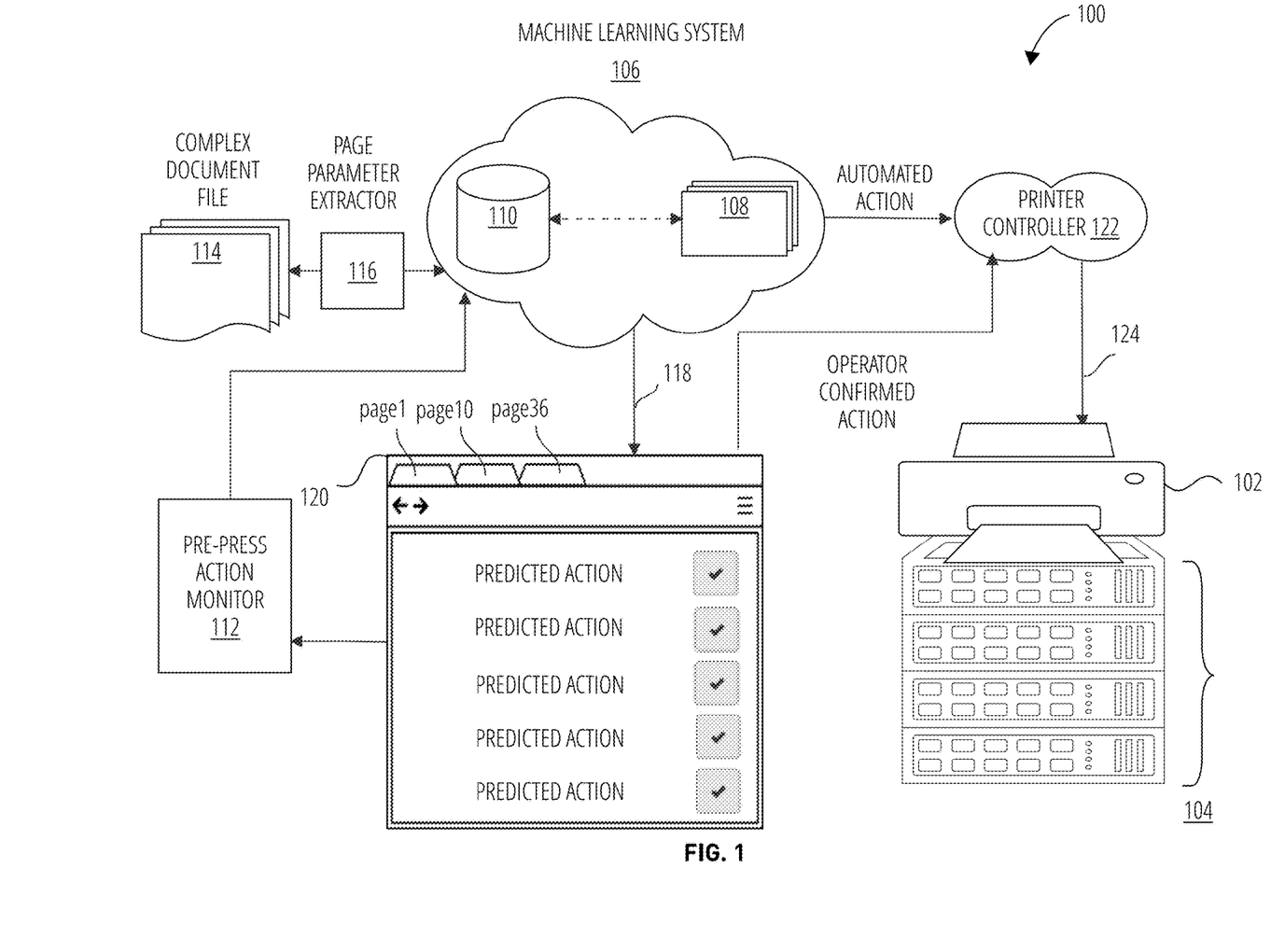
FIG. 1 illustrates a printing system 100 in accordance with one embodiment.

The mechanisms described herein are application to any system that enables users to perform pre-press operations and define job ticketing. For example:

1. web-based printing systems
2. output management systems
3. ad-hoc workflow systems FIG. 1 illustrates a printing system 100 in accordance with one embodiment. The printing system 100 includes a printer 102 with one or more page stock bays 104, a machine learning system 106 comprising a classification model 108 and error function 110. The machine learning system 106 is responsive to a pre-press action monitor 112 and to page parameters for a complex document file 114 output from a page parameter extractor 116 to generate a plurality of pre-press operator action predictions 118, which may be provided for operator review and confirmation on a pre-press operator machine interface 120 (also referred to herein as an operator console). Confirmed (or automated) pre-press operator actions are sent to a printer controller 122 which applies control signals 124 for the pre-press operator actions to the printer 102. Other elements of the printing system 100 known in the art are omitted to simplify this description.

The printer 102, the machine learning system 106, the printer controller 122 and the pre-press operator machine interface 120 typically communicate over a network (not shown). The pre-press operator is provided a complex document file 114 (e.g., Microsoft Word, Portable Document Format, HTML, etc.) assembled using a device such as a laptop or a desktop computer (for example). The complex document file 114 may typically be assembled from one or more distinct electronic documents. For example, a professor may select one or more chapters from one or more textbooks to print for a specific course, scan the pages (if the books are not already digital), and concatenate the resulting digital files into the complex document file 114. The professor may provide these chapters to the pre-press operator separately in paper or digital form, or may provide the assembled complex document file 114. Thus, the complex document file 114 often includes multiple sections from diverse sources.

The machine learning system 106 is utilized to predict pre-press operator actions and, in some cases, to automatically select an initial set of pre-press actions to apply for printing the complex document file 114. In some embodiments, the machine learning system 106 is trained, at least initially, by a training set of data. The training set of data may comprise pairs of values. Each pair of values includes an input value and an output value. The output value is a desired value corresponding to the input value. In some embodiments, the printing system 100 uses a bias-variance tradeoff algorithm or a noise in the output values algorithm to train the machine learning system 106. In some embodiments, the printing system 100 uses a function complexity and amount of training data algorithm or dimensionality of the input values algorithm to train the machine learning system 106. In some embodiments, the printing system 100 uses a support vector machines algorithm or a linear regression algorithm to train the machine learning system 106. These techniques may be applied by the machine learning system 106 individually, in various combinations, or in combination with training of an artificial neural network, as described in more detail below.

The machine learning system 106 applies the training set of data to build the classification model 108. The machine learning system 106 applies the classification model 108 to generate pre-press operator action predictions 118 for the complex document file 114 based on page parameters identified for the complex document file 114 by the page parameter extractor 116. In some embodiments, the page parameter extractor 116 is part of the machine learning system 106 and in others it is a separate logical component of the printing system 100. The page parameters may be represented as metadata associated with the document, such as page dimensions or page orientations, text page orientations, font sizes, or page tab annotations, or they may be derived by analyzing the content of the complex document file 114. Additional examples of page parameters include word counts, text block locations, content areas, and content types identified in the complex document file 114. Page parameters can also be page bookmarks and color modes used in the complex document file 114, for example. Generally, the page parameters may be determined automatically by the page parameter extractor 116 or provided to the machine learning system 106 manually by the pre-press operator, or by a combination of automated and manual input.

The machine learning system 106 correlates the page parameters to predictions for desirable pre-press operator actions on the complex document file 114. The machine learning system 106 may for example correlate resizing and rotating the document pages or de-skewing pages or de-speckling pages or marking page holes with the determined page parameters, correlate page numbering or adding page tabs and page tab annotations with the determined page parameters, and/or correlate defining media and finishing properties with the determined page parameters.

In some embodiments, the pre-press operator then operates the pre-press operator machine interface 120 to select or deselect (or change) the predicted pre-press operator actions. Confirmations or changes are monitored by the pre-press action monitor 112 and fed back to the machine learning system 106 to enhance the classification model 108. The classification model 108 may then be used to generate improved predictions and correlations in the future. For example, the machine learning system 106 may learn pre-press operator actions for certain sets of page parameters such as assigning the first and last two document pages to heavier page stock from the page stock bays 104, adding page tabs between concatenated files or document sections, adding page tab annotations before document pages with top-level bookmarks, assigning coated page stock to document pages with large images, or resizing document pages if the page size is above a pre-defined page size. For example, the machine learning system 106 may learn to resize pages larger than A4 to A3. Depending on the implementation, these learned associations may be particular to a person, organization, or work type in addition to being correlated to particular page parameters.

In other examples the machine learning system 106 may learn to predict the resizing or rotation or fitting of pages with certain font size or page orientations or page numbers, to predict resetting the page numbers at a file or section boundary, and/or to predict to not place the page numbers on pages with font sizes above a pre-defined font size.

As the machine learning system 106 receives more pre-press operator actions and pre-press operator decisions from the pre-press action monitor 112 (which may be part of the pre-press operator machine interface 120 logic in some embodiments), the machine learning system 106 applies them to future predictions utilizing an error function 110 to iteratively adjust the classification model 108. In some embodiments, once an accuracy of a certain prediction reaches a pre-defined threshold, the printing system 100 adds the prediction to automatic actions that are automatically applied to the printer controller 122 and not subject to confirmation via the pre-press operator machine interface 120.

The machine learning system 106 may classify documents based on their content. For example, if a document is primarily text or tables or figures, as indicated by the page parameter extractor 116, it may be classified as a business document (e.g., annual report). This classification may lead to selection of a particular classification model 108. The machine learning system 106 may utilize and enhance different classification models for different document types, for different customers or customer types (e.g., real estate agents vs. university professors), or for combinations thereof.

The machine learning system 106 outputs pre-press operator action predictions 118 to the pre-press operator via the pre-press operator machine interface 120. Once confirmed or modified by the pre-press operator, the pre-press operator action predictions 118 are applied to the printer controller 122. The printer controller 122 applies the pre-press operator actions (e.g., selecting from the page stock bays 104 for particular sheets, adding page tabs, rotating or resizing certain pages etc.) to the printer 102 as control signals to print the complex document file 114.

Figure 2:
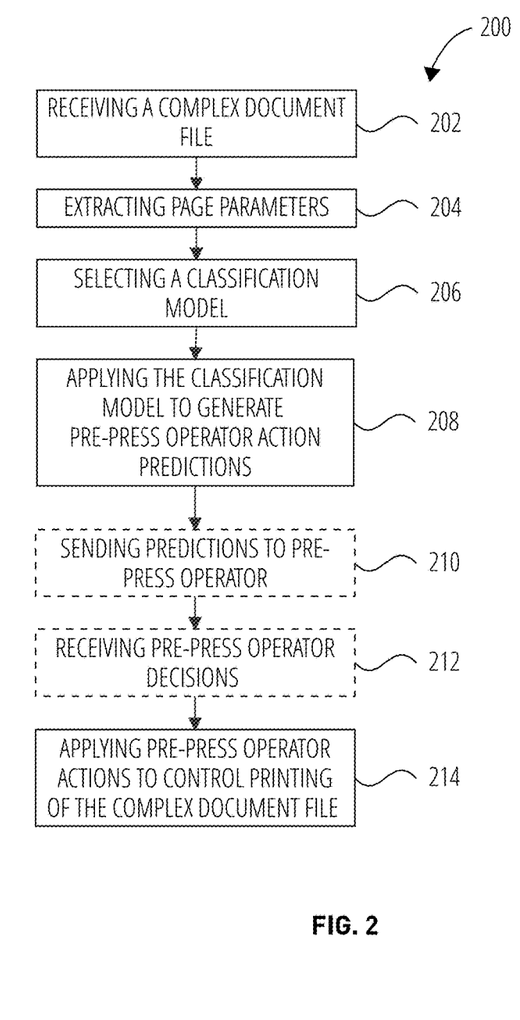
FIG. 2 illustrates a complex document printing process 200 in accordance with one embodiment.

FIG. 2 illustrates a complex document printing process 200 in accordance with some embodiments. As shown at block 202, the complex document printing process 200 begins with receiving a complex document file. Page parameters are extracted from the complex document file (block 204). The complex document printing process 200 then selects a classification model for use by a machine learning system on the page parameters, as shown at block 206. The classification model is applied to the complex document file to generate pre-press operator action predictions, as shown at block 208.

The pre-press operator action predictions are (optionally) provided for confirmation by the pre-press operator, as shown at block 210. For example, the pre-press operator may be provided with options to confirm or reject each of the pre-press operator action predictions. Also optionally, the decisions as to accuracy of the predictions are received by the machine learning system from the pre-press operator, as shown at block 212.

The pre-press operator actions are then applied to control printing of the complex document file. In some embodiments the pre-press operator action predictions are converted by the machine learning system into automated actions to control printing of the complex document file (block 214) without intervention by the pre-press operator to confirm the page parameter predictions. In other embodiments the pre-press operator confirms the pre-press operator action predictions before they are applied for printing. Thus block 210 and block 212 may be optional steps.

Figure 3:
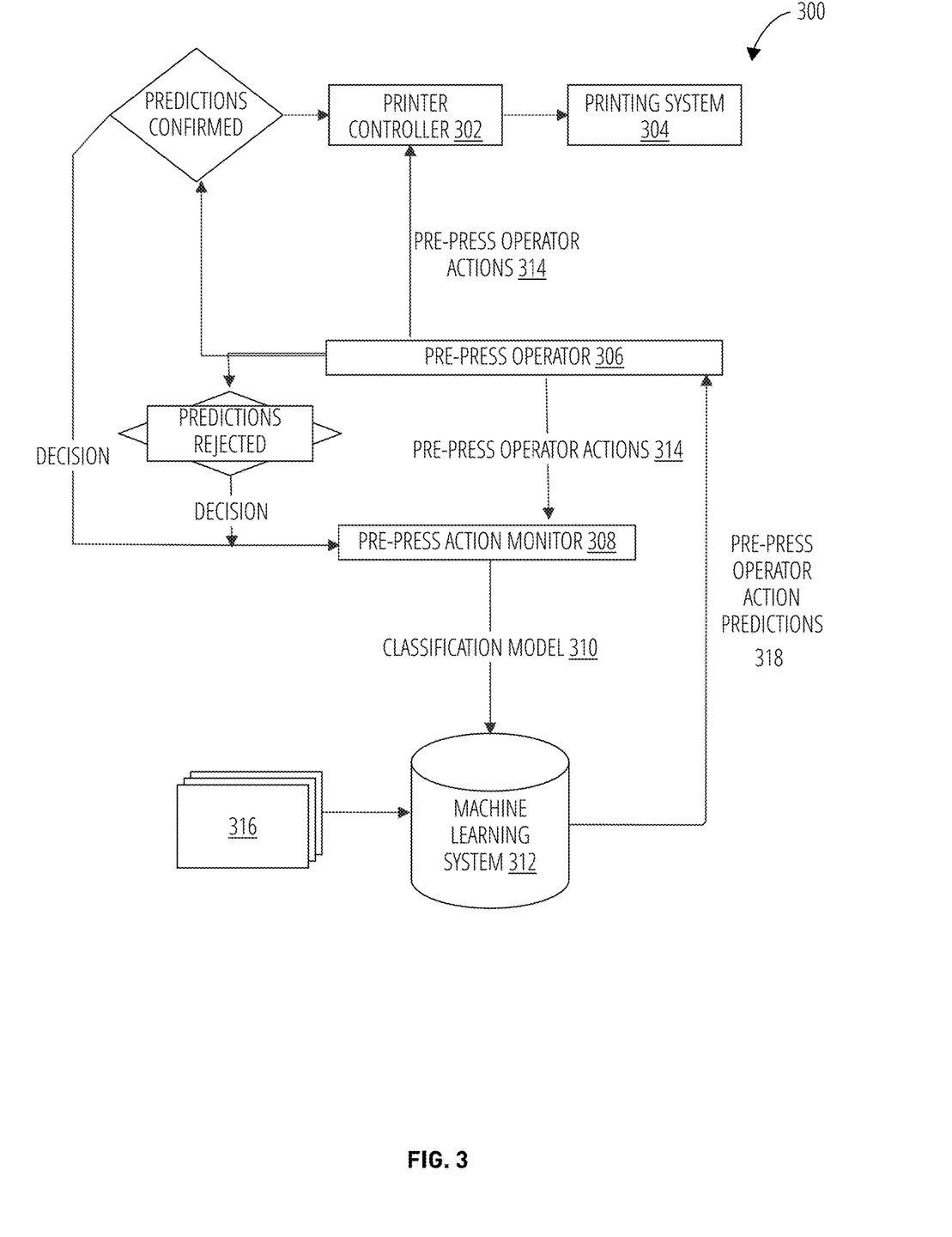
FIG. 3 illustrates a printer control process 300 in accordance with one embodiment.

FIG. 3 illustrates printer control process 300 in one embodiment. The pre-press operator 306 generates pre-press operator actions 314 which are input by a pre-press action monitor 308 and which may also be applied to the printer controller 302. The pre-press operator actions 314 are applied to enhance a classification model 310 of the machine learning system 312. In some embodiments, the machine learning system 312 also receives the page parameters 316 for the complex document file being printed, and applies the classification model 310 in the context of the page parameters 316.

In some embodiments, for some or all of the pre-press operator action predictions 318 output from the machine learning system 312, the pre-press operator 306 receives prompts to confirm or reject the pre-press operator action predictions 318. Once confirmed, the pre-press operator actions 314 are applied to the printer controller 302 which subsequently controls the printing system 304 accordingly to print the complex document file. The decision to confirm or reject pre-press operator action predictions 318 is also provided to the pre-press action monitor 308 to enhance the classification model 310. The classification model 310 may give more weight to pre-press operator actions for certain printing categories. For example, the classification model 310 may give more weight to decisions for complex document files for particularly active (high-volume print job sources) users, customers, or customer types, vs if the decisions are for a complex document file from a less active source.

Figure 4:
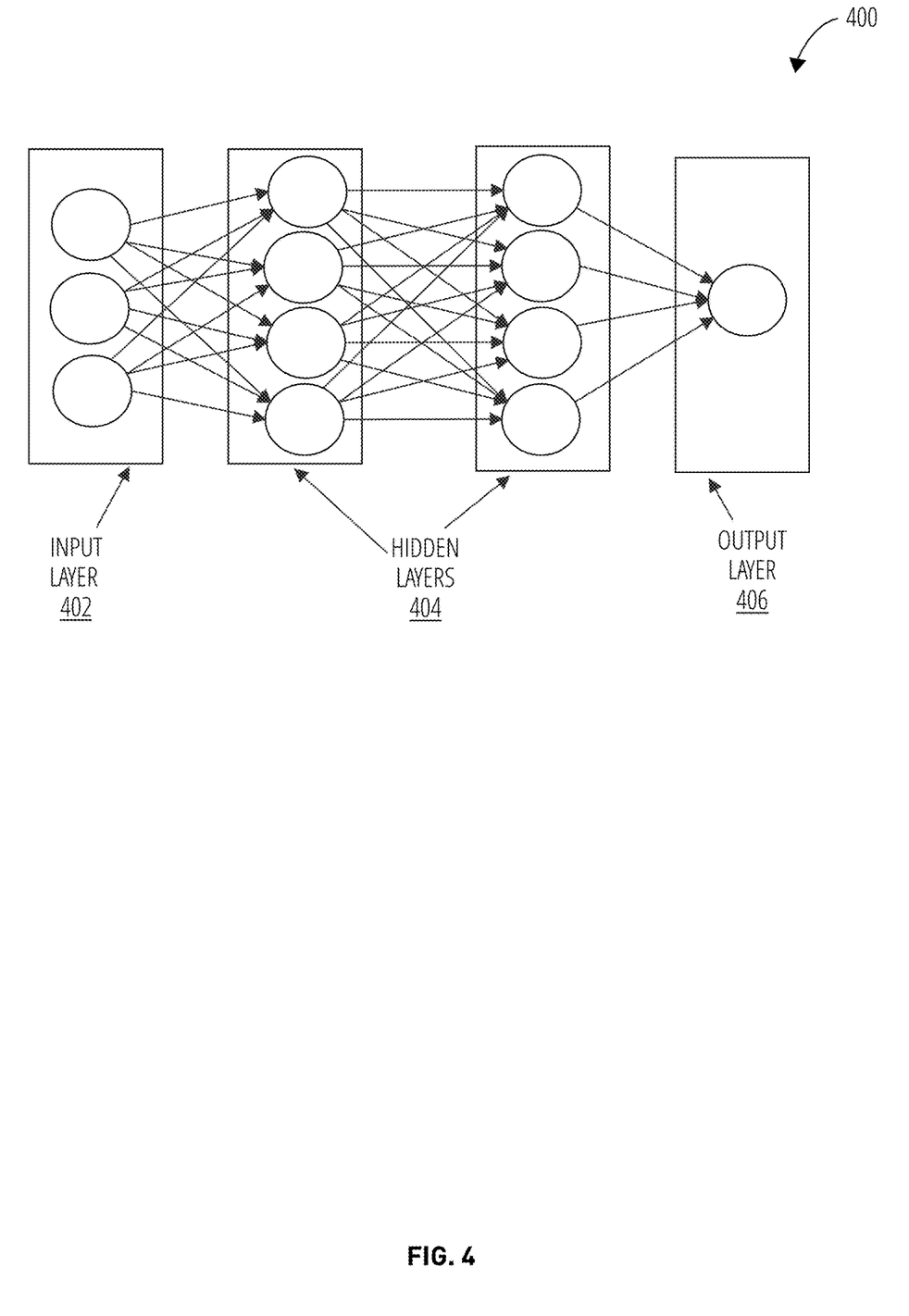
FIG. 4 illustrates a machine learning deep neural network 400 in accordance with one embodiment.

FIG. 4 illustrates a machine learning deep neural network 400 that may be utilized as a machine learning system component in one embodiment. The machine learning deep neural network 400 comprises a collection of connected processing units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 402), to the last layer (the output layer 406), possibly after traversing one or more intermediate layers, called hidden layers 404.

In the printing system 100, the machine learning system 106 may comprise a machine learning deep neural network 400 for which the page parameters of a complex document file and pre-press operator actions used therewith are applied to the input layer 402. The input layer 402 may thus have a dimension 1×N, where N is the combined number of page parameters and pre-press operator actions to learn from. The output layer 406 may have dimensions 1×M, where M is the number of pre-press operator action predictions generated by the machine learning system 106 for a particular classification model.

In some embodiments, a single-layer Feedforward Neural Network is used. In some embodiments, a bilayer Radial Basis Function Neural network is used. In some embodiments, a Recurrent Neural Network (RNN) is used. The RNN works on the principal of saving the output of a layer and feeding it back to the input to help in predicting the outcome of the layer. The first layer is formed with the product of the sum of the weights and the features. In some embodiments, a Conventional Neural Network (CNN) is used, in which the neurons have learnable weights and biases. In some embodiments, a Modular Neural network (MNN) is used. The MNN has a collection of different networks working independently and contributing towards the output. Each neural network has a set of inputs which are unique. The neural networks do not interact or signal each other in accomplishing tasks. The MNN breakdowns a large computational process into smaller components thus decreasing complexity.

Figure 5:
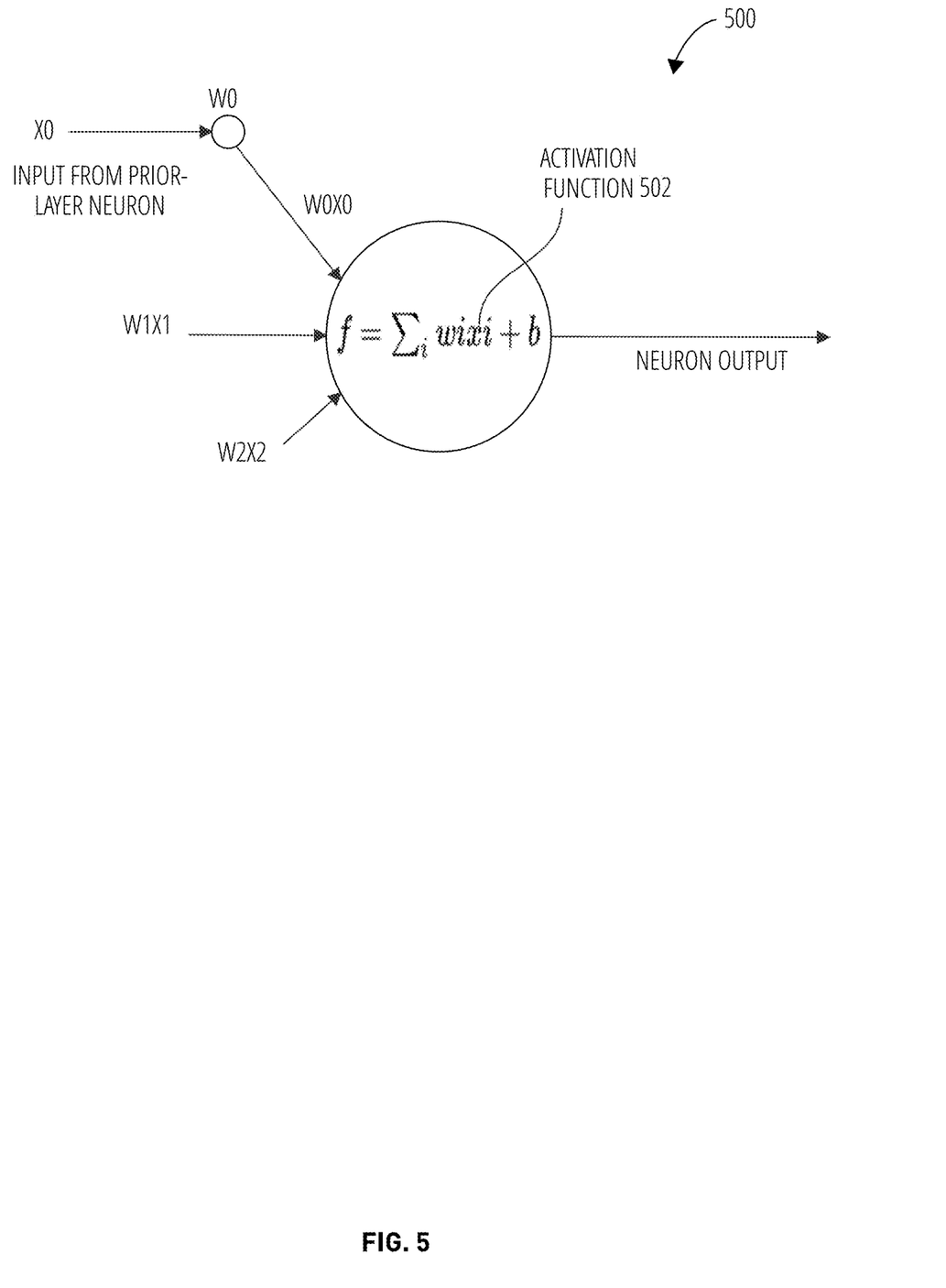
FIG. 5 illustrates an artificial neuron 500 in accordance with one embodiment.

FIG. 5 illustrates an artificial neuron 500 that may be utilized in a deep neural network such as machine learning deep neural network 400. If the artificial neuron 500 is not in the input layer 402, it receives inputs from predecessor neurons consists of the following components:

inputs $x_i$;

weights $w_i$ applied to the inputs;

an optional threshold (b), which stays fixed unless changed by a learning function; and an activation function 502 that computes the output from the previous neuron inputs and threshold, if any.

An input neuron has no predecessor but serves as input interface for the whole network. Similarly an output neuron has no successor and thus serves as output interface of the whole network.

The network includes connections, each connection transferring the output of a neuron in one layer to the input of a neuron in a next layer. Each connection carries an input x and is assigned a weight w.

The activation function 502 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the network.

In some embodiments, the machine learning system gives more weight to pre-press operator actions to predict page parameters. In some implementations, when a pre-press operator rejects a page parameter prediction, the machine learning system decreases the weights applied to that page parameter in the future. Thus for example the error function 110 may be utilized to adjust the weights for the artificial neurons in the machine learning deep neural network 400, in one embodiment. Various adjustments to the weights may be performed to minimize the error function such as the well-known gradient descent algorithms. In some implementations, the activation function is used to map the resulting values into the desired range (e.g., 0 to 1 or −1 to 1). For example, the use of a logistic activation function maps all inputs in the real number domain into the range of 0 to 1.

Figure 6:
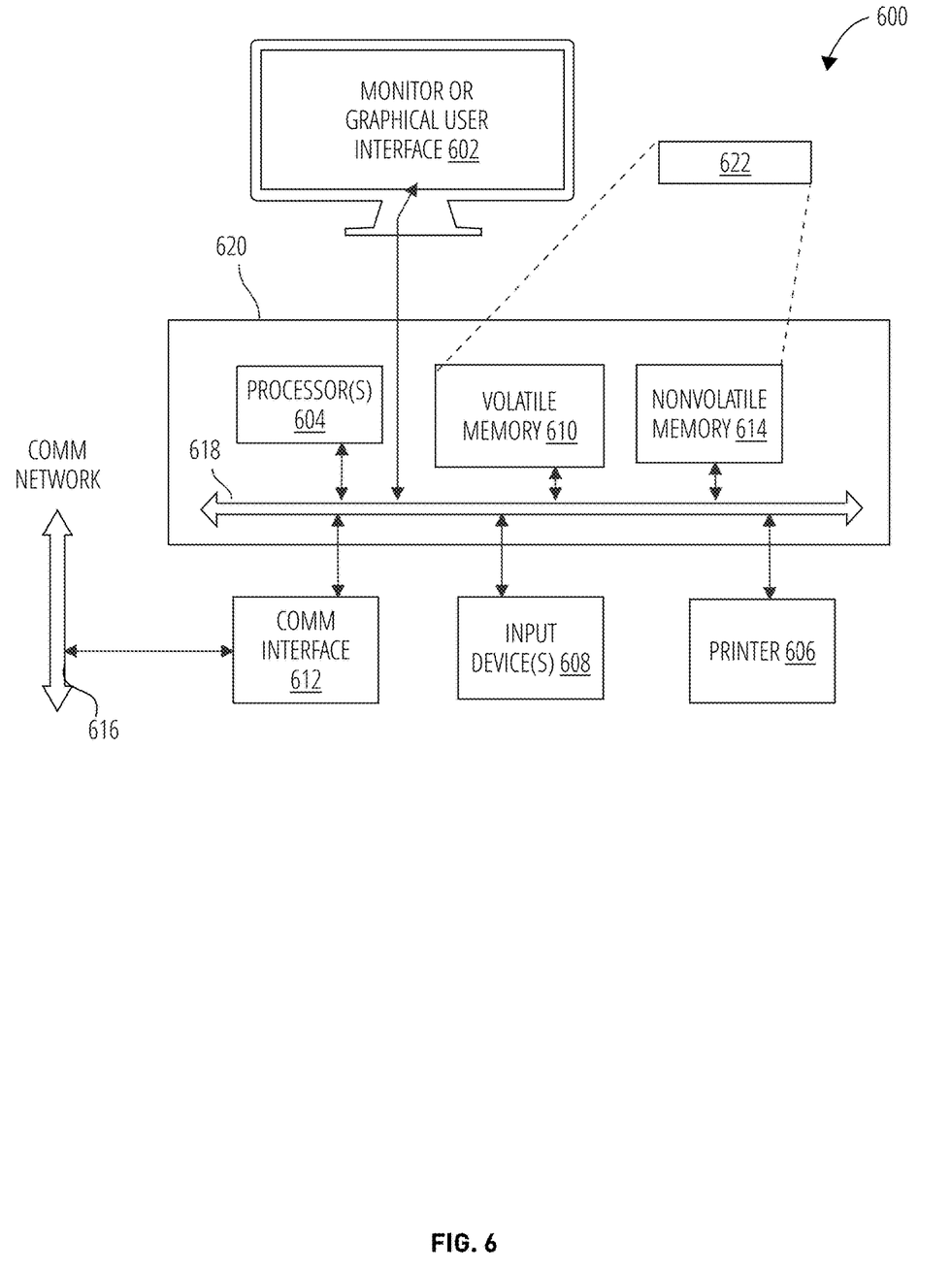
FIG. 6 is an example block diagram of a computing device 600 that may incorporate embodiments of the present invention.

FIG. 6 is an example block diagram of a computing device 600 that may incorporate embodiments of the present invention. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 typically includes a monitor or graphical user interface 602 (which can serve as the pre-press operator machine interface 120), a data processing system 620 (which can include the machine learning system 106), a communication network interface 612, input device(s) 608 (e.g., to receive pre-press operator action decisions on predictions), printer 606, and the like.

As depicted in FIG. 6, the data processing system 620 may include one or more processor(s) 604 that communicate with a number of peripheral devices via a bus subsystem 618. These peripheral devices may include input device(s) 608, printer 606, communication network interface 612, and a storage subsystem, such as a volatile memory 610 and a nonvolatile memory 614.

The volatile memory 610 and/or the nonvolatile memory 614 may store computer-executable instructions and thus forming logic 622 that when applied to and executed by the processor(s) 604 implement embodiments of the processes disclosed herein, such as complex document printing process 200 and printer control process 300.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like. In some embodiments, the input device(s) 608 perform functions of the pre-press operator machine interface 120 of FIG. 1.

The printer 606 includes devices and mechanisms for outputting information from the data processing system 620. These may include the monitor or graphical user interface 602, speakers, printers, infrared LEDs, and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, ISDN), (asynchronous) digital subscriber line (DSL), FireWire, USB, a wireless communication interface such as Bluetooth or Wi-Fi, a near field communication wireless interface, a cellular interface, and the like. As previously noted, various components of the printing system 100 may operate over such a communication network 616.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware. The computing device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present invention.

Logic 622 that implements embodiments of the present invention may be stored in the volatile memory 610 and/or the nonvolatile memory 614. Said logic 622 may be read from the volatile memory 610 and/or nonvolatile memory 614 and executed by the processor(s) 604. The volatile memory 610 and the nonvolatile memory 614 may also provide a repository for storing data used by the logic 622.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files, such as the classification model 108. The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

In some embodiments, the logic 622 instructs the machine learning system to receive the pre-press operator actions from the pre-press operator, implements the classification model, transform the complex document file into page parameter predictions, generate the pre-press operator action predictions, and enhance the classification model based on the pre-press operator actions and/or pre-press operator decisions.

It will be readily apparent to one of ordinary skill in the art that the computing device 600 may be a device such as a desktop computer, a laptop computer, a rack-mounted computer system, a computer server, a tablet computer device, or even a smartphone. As commonly known in the art, the computing device 600 may be implemented as a collection of multiple networked computing devices. Further, the computing device 600 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A system comprising:
a machine learning system comprising a deep neural network including an input layer and an output layer;
the machine learning system configured to apply, to the input layer, page parameters of a complex document file to transform the complex document file into pre-press operator action predictions for the complex document file;

an operator console to display prompts to confirm or reject the pre-press operator action predictions, and to apply, to the output layer, responses to the prompts to enhance a classification model and to control a printer; and the machine learning system configured to receive a training data comprising a plurality of sets of training examples, each training example comprising an input value of page parameters and an output value of pre-press operator actions.

2. The system of claim 1, wherein the machine learning system is further configured to: apply manual pre-press operator actions on the complex document file to modify the classification model.

3. The system of claim 1, wherein the pre-press operator action predictions comprise one or more of the following:

resizing or rotating pages, selection of page stock, page de-skewing, page de-speckling, marking page holes, page numbering, adding page tabs, adding page tab annotations, and one or more page finishing properties.

4. The system of claim 1, wherein the page parameter is a page number of each page from a start of each section boundary of the complex document file, and from an end of each section boundary of the complex document file.

5. The system of claim 1, wherein the page parameters are derived from metadata associated with the complex document file.

6. The system of claim 1, wherein the page parameters comprise one or more of the following: a page dimension, a page orientation, a text orientation, a font size, and a word count.

7. The system of claim 1, wherein the page parameters comprise one or more of the following: a text block location, a content area, a content type, a color mode, and a bookmark.

8. A method of configuring a deep neural network, the method comprising:

receiving, by the deep neural network, a complex document file comprising a plurality of document sections, wherein each of the document sections comprises one or more document pages, wherein the deep neural network includes an input layer, an output layer, and a machine learning classifier;

extracting page parameters from the complex document file;

selecting, by the machine learning classifier, a classification model from a plurality of classification models, the classification model selected based on a first criterion;

applying, by the machine learning classifier to the input layer, the classification model to transform the page parameters into pre-press operator action predictions, on the output layer, for one or more of the document pages;

generating, by an operator console, prompts to a pre-press operator to confirm or reject the pre-press operator action predictions;

applying, by a printer controller, responses to the prompts received from the pre-press operator to control a printer and to update the classification model;

receiving, by the machine learning classifier and from the pre-press operator, a plurality of training data labeled as training data, the plurality of training data comprising a plurality of sets of training examples, each training example comprising a first input value and a second output value, the output value being a desired value corresponding to the first input value; and applying, by the machine learning classifier, pre-press operator actions to modify the classification model.

9. The method of claim 8, wherein the first criterion is a document type.

10. The method of claim 8, wherein the first criterion is a user or user type.

11. The method of claim 8, further comprising:

applying, by the classifier, the pre-press operator responses to modify the classification model.

12. The method of claim 8, wherein the pre-press operator action predictions are one or more of:

resizing or rotating pages, selection of page stock, page de-skewing, page de-speckling, marking page holes, page numbering, adding page tabs, adding page tab annotations, and one or more page finishing properties.

13. The method of claim 8, wherein the page parameters are one or more of:

a text block location, a content area, a content type, a color mode, and a bookmark.

14. The method of claim 8, wherein the page parameters are derived from metadata of the complex document file.

15. The method of claim 8, further comprising utilizing a set of rejected pre-press operator action predictions in an error function of the machine learning classifier.

16. A non-transitory computer storage that stores executable program instructions that, when executed by one or more computing devices, configure the one or more computing devices to:

extract page parameters from the complex document file comprising a plurality of document sections, wherein each of the document sections comprises one or more document pages;

receive, by a deep neural network, the page parameters, wherein the deep neural network includes an input layer, an output layer, and a machine learning classifier;

apply the machine learning classifier, to the input layer, the machine learning classifier comprising a classification model to transform the page parameters into pre-press operator action predictions, on the output layer, for one or more of the document pages;

operate a printer controller and update the classification model with a set of confirmed pre-press operator action predictions, and utilize a set of rejected pre-press operator action predictions in an error function of the machine learning classifier.

17. The non-transitory computer storage of claim 16, wherein a first criterion for selection the classification model is one or more of a document type, user, or user type.

* * * * *